Sept. 27, 1949.　　　　　L. A. BEAN　　　　　2,482,999
FISH POLE HOLDER AND LIFTER
Filed Nov. 5, 1947　　　　　　　　　　　　2 Sheets-Sheet 1
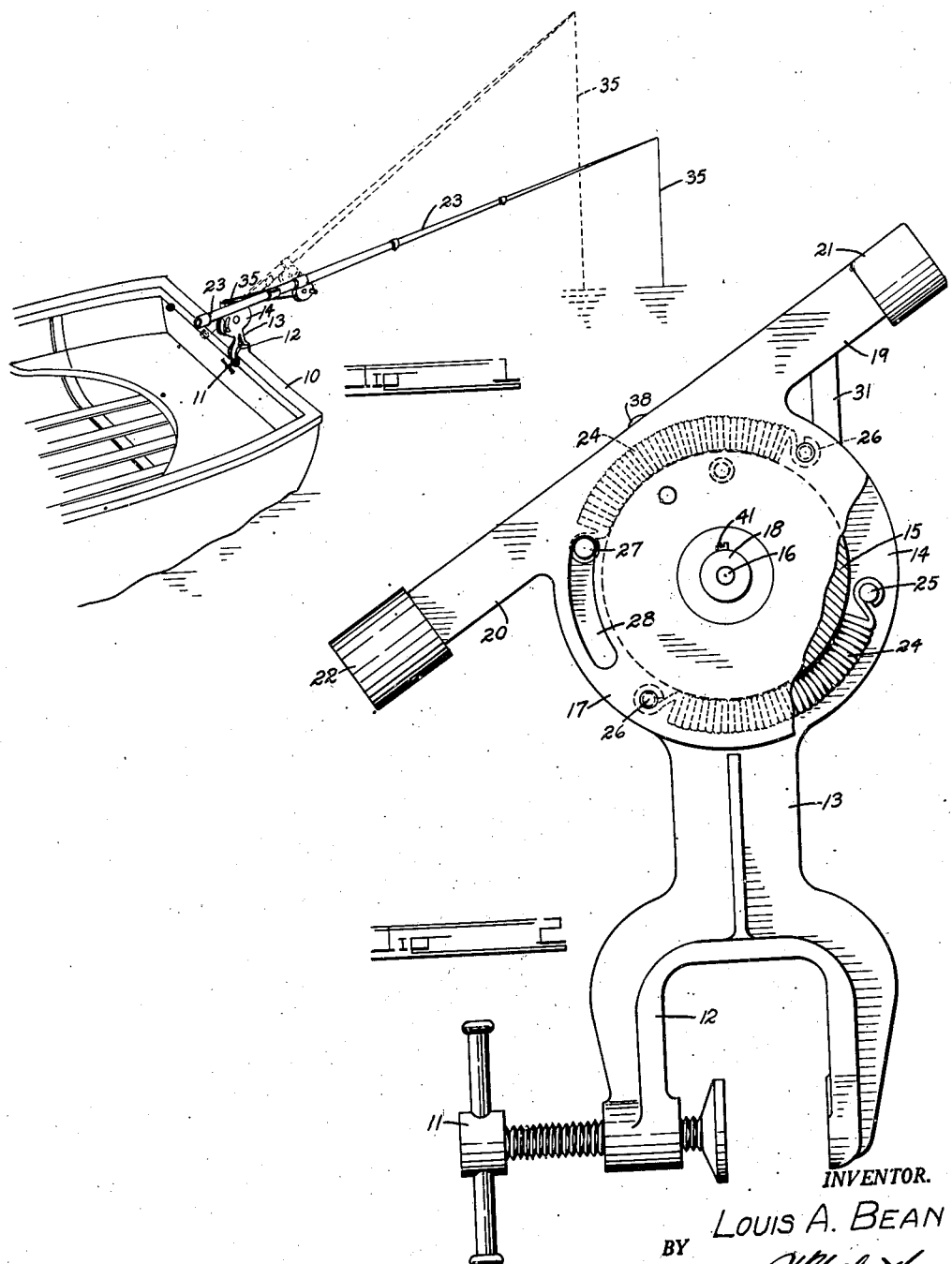
INVENTOR.
LOUIS A. BEAN
BY
ATTORNEY Sept. 27, 1949.　　　　　L. A. BEAN　　　　　2,482,999
FISH POLE HOLDER AND LIFTER
Filed Nov. 5, 1947　　　　　　　　　　2 Sheets-Sheet 2
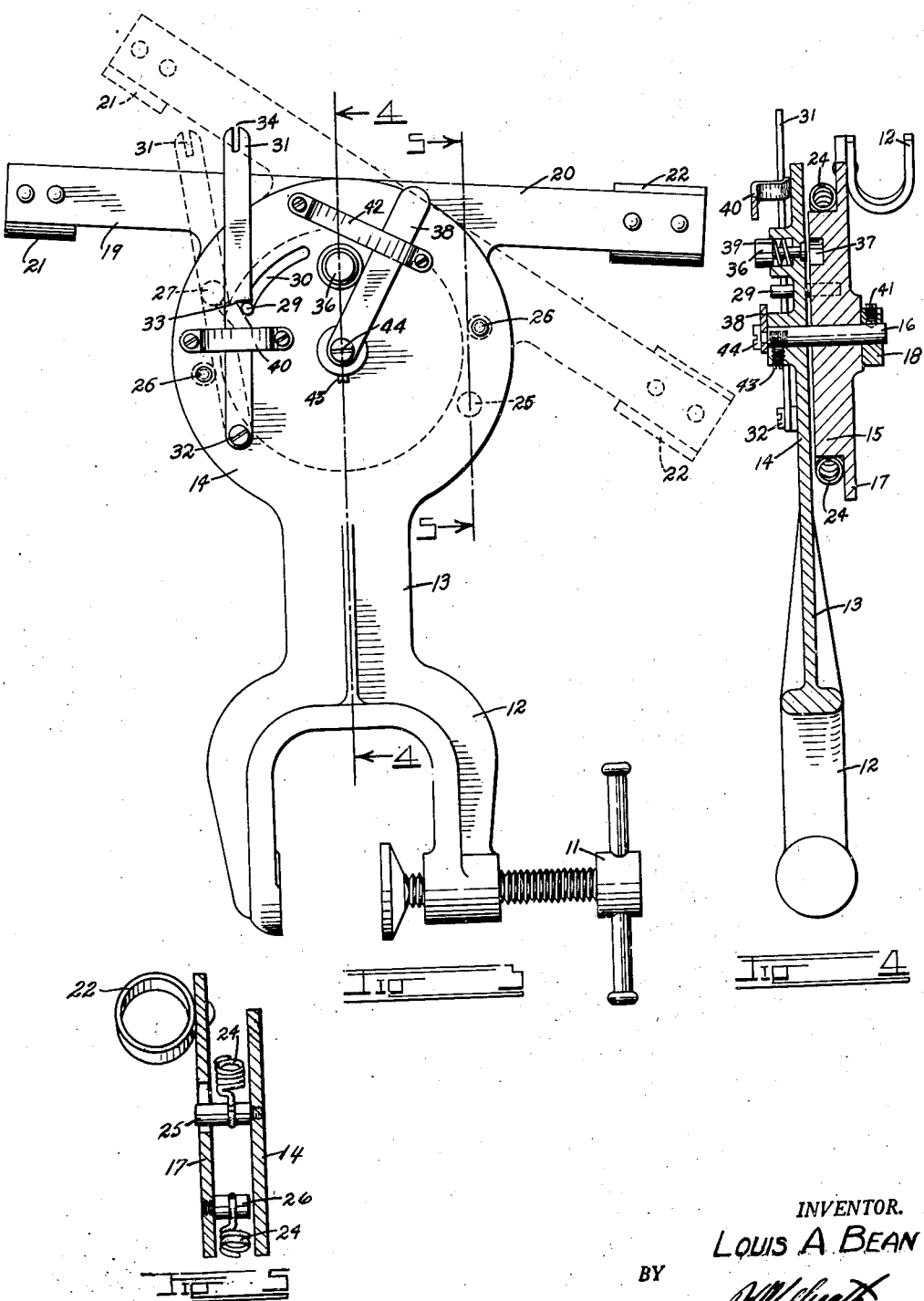
INVENTOR.
LOUIS A. BEAN Patented Sept. 27, 1949

2,482,999

UNITED STATES PATENT OFFICE 2,482,999

FISH POLE HOLDER AND LIFTER

Louis A. Bean, Indian Hills, Colo.

Application November 5, 1947, Serial No. 784,213

4 Claims. (Cl. 43—15)

This invention relates to a device for supporting a fishing rod from any desired support, such as the gunwale of a boat or a railing on a wharf or pier.

The principal object of the invention is to provide a support for fishing rods which can be quickly and easily attached to any suitable supporting structure, and which will automatically operate in consequence of a pull upon the line to snap the rod upwardly to hook the fish.

Other objects and advantages reside in the detailed construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates the appearance of the improved fishing rod holder as it would appear in use;

Fig. 2 is a side view thereof;

Fig. 3 is a side view thereof, taken on the side opposite to that of Fig. 2, and illustrating, in broken lines, the raised position of the rod;

Fig. 4 is a vertical section, taken on the line 4—4, Fig. 3; and

Fig. 5 is a detail section, taken on the line 5—5, Fig. 3.

In the drawing, a fixed support, such as a boat or other structure, is indicated at 10. The improved support is clamped to the boat 10 by means of a clamp screw 11 extending through a C clamp member 12. A standard 13 arises vertically from the clamp 12 and terminates in a vertically positioned fixed plate 14 having a central axle shaft 16 locked therein by means of a set screw 43. An outer rotary plate 17 is mounted on the axle shaft 16. The plate 17 is provided with a cylindrical boss or drum 15 which is held against the plate 14 by means of a set collar 18 which is secured on the axle shaft 16 against the plate 17 by means of a set screw 41.

A pair of rod arms 19 and 20 are formed on and project oppositely outward from the periphery of the rotary plate 17. The arm 19 terminates in a rod hook 21, and the arm 20 terminates in a rod ring 22.

The rod hook 21 and the rod ring 22 are for the purpose of supporting the butt end of a fishing rod 23. Two spiral tension springs 24 are bent around the cylindrical drum or boss 15. Each spring extends from a spring stud 25 on the fixed disc 14 to a spring stud 26 on the rotary plate 17 so that the tension in the springs constantly urges the rotary plate to rotate to elevate the rod hook 21 and the fishing rod 23.

The upward and downward movement of the rod is limited by means of a stop pin 27 which projects from the fixed plate 14 through an arcuate slot 28 in the rotary plate 17. The plate 17 is held against the tension of the springs 24 by means of a ratchet pin 29 which extends from the boss 15 through an arcuate ratchet slot 30 in the fixed plate 14.

A release lever 31 is pivoted upon a pivot screw 32 on the fixed plate 14. The lever 31 is provided with a locking notch 33 positioned to engage the pin 29 when the hook 21 is in its lowermost position. The lever 31 is provided with a line slot 34, through which the fishing line, indicated at 35, is passed.

It can be readily seen that a pull upon the line 35 will swing the lever 31 away from the pin 29, allowing the latter to move, under the action of the springs 24, to the elevated position of Fig. 3 and broken line position of Fig. 1, thus withdrawing the line and the fish from the water.

Should it not be desired to employ the automatic feature of the rod holder, a locking button 36 is provided which extends through the plate 14 and into a receiving opening 37 in the boss 15.

To prevent rotation of the plate 17, the button 36 is held in engagement with the receiving opening in the fixed plate 14 by means of a locking lever 38 which can be swung over the head of the button. The locking lever 38 is mounted on a pivot screw 44 in the end of the shaft 16. A spring 39 constantly urges the button out of engagement so that, as the lever 38 is swung to one side, the button will snap to the inoperative position. The two levers 31 and 38 are supported and guided by means of straps 40 and 42, respectively.

In use, the fisherman baits his hook and drops the line 35. He then forces the rod 23 downwardly to the substantially horizontal position and hooks the notch 33 over the pin 29. The rod needs no further attention until the line is jerked by a fish. This swings the lever 31, releasing the pin 29 and allowing the rod to snap upwardly.

The drum 15 could, of course, be attached to either plate or could be an independently rotatable member, as desired.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A fishing rod holder comprising: a fixed support; a rotary plate supported from said fixed support and having an integral concentric cylindrical drum formed on one of its faces and separating said plate from said support; spring means fixed at one extremity to said support, and at the other extremity to said plate and extending about said drum to urge the latter to rotate; a trigger mechanism for preventing rotation; means for supporting a fishing rod from said rotary plate; and means for actuating said trigger mechanism.

2. Means for supporting a fishing rod comprising: a rotary plate provided with an integral cylindrical drum projecting from one face thereof; arms projecting oppositely outward from said plate; means for securing said arms to a fishing rod; a stationary plate positioned against said drum; an axle shaft extending through said drum and through both plates; a spring partially wrapped about said drum; means for securing one extremity of said spring to said fixed plate; means securing the other extremity thereof to said rotary plate; and releasable means for maintaining said rotary plate stationary against the action of said spring.

3. Means for supporting a fishing rod comprising: a rotary plate provided with an integral cylindrical drum projecting from one face thereof; arms projecting oppositely outward from said plate; means for securing said arms to a fishing rod; a stationary plate positioned against said drum; an axle shaft extending through said drum and through both plates; a spring partially wrapped about said drum; means for securing one extremity of said spring to said fixed plate; means securing the other extremity thereof to said rotary plate; a pin projecting from said rotary plate; a releasing lever hinged to said fixed plate so as to swing against said pin, said lever having a notch for receiving and holding said pin; and means for attaching a fish line to said lever so that a pull upon said line will cause the lever to release said pin to allow said spring to rotate said rotary plate to elevate said fish rod.

4. Means for supporting a fishing rod comprising: a rotary plate provided with an integral cylindrical drum projecting from one face thereof; arms projecting oppositely outward from said plate; means for securing said arms to a fishing rod; a stationary plate positioned against said drum; an axle shaft extending through said drum and through both plates; a spring partially wrapped about said drum; means for securing one extremity of said spring to said fixed plate; means securing the other extremity thereof to said rotary plate; a pin projecting from said rotary plate; a releasing lever hinged to said fixed plate so as to swing against said pin, said lever having a notch for receiving and holding said pin; means for attaching a fish line to said lever so that a pull upon said line will cause the lever to release said pin to allow said spring to rotate said rotary plate to elevate said fish rod; and means for locking said rotary plate against rotation when desired.

LOUIS A. BEAN.

REFERENCES CITED

The following references are of record in the file of this patent:

UNITED STATES PATENTS

| Number | Name | Date |
| --- | --- | --- |
| 562,195 | Plath | June 16, 1896 |
| 565,001 | Horton | Aug. 4, 1896 |